CEMENT SOLE ATTACHING MACHINES

Filed May 4, 1954 4 Sheets-Sheet 1

Inventors
Sidney J. Finn
Walter L. Benedict
By their Attorney

Inventors
Sidney J. Finn
Walter L. Benedict
By their Attorney

Inventors
Sidney J. Finn
Walter L. Benedict
By their Attorney

CEMENT SOLE ATTACHING MACHINES

Filed May 4, 1954 4 Sheets-Sheet 4

Inventors
Sidney J. Finn
Walter L. Benedict
By their Attorney

United States Patent Office 2,799,876

Patented July 23, 1957

2,799,876

CEMENT SOLE ATTACHING MACHINES

Sidney J. Finn, Beverly, and Walter L. Benedict, Stoneham, Mass., assignors to United Shoe Machinery Corporation, Boston, Mass., a corporation of New Jersey Application May 4, 1954, Serial No. 427,601

47 Claims. (Cl. 12—37)

This invention relates to machines for applying pressure to shoe bottoms such as cement sole attaching machines. It is illustrated herein as a machine having four pads and pressure applying devices mounted on a turret which is movable about a vertical axis to bring the pads in turn to a loading station.

Objects of the invention are to provide a machine of this type which is safe, compact and easily operated, and one in which the pressure is applied and the turret rotated by combined mechanical and electromagnetic means.

In United States Letters Patent No. 2,575,360, granted November 20, 1951, in the name of Jacob Rabinow, is described a magnetic fluid torque and force transmitting device the principle of which is preferably employed both in applying predetermined pressure to the shoe and in effecting and controlling the movement of the turret. It is possible, however, and is believed to be novel to use other electromagnetic devices in the place of those herein described.

For applying pressure to the shoe there is combined with the Rabinow device an antifriction screw such as that described in "Mechanical Movements, Devices and Appliances" by Hiscox, page 215, in which bearing balls engage a helical groove in a screw and a helical groove in a nut to provide a thread for advancing the screw. As illustrated, a single such screw acts on a whiffletree connected at each end to an abutment, one for engaging the toe end of a lasted shoe and the other for engaging its last. A motor is provided for rotating the screw, and between the motor and screw is a magnetic fluid clutch, preferably of the Rabinow type, for transmitting torque to the screw. The amount of torque transmitted depends upon the amount of current supplied to the magnetic device. It is therefore possible, by varying the current, to transmit within limits any predetermined amount of torque and hence any desired pressure to the shoe.

As illustrated, the motor and the torque transmitting device remain at the loading station while each pad on the turret is provided with an antifriction screw and other parts of the pressure applying mechanism. At the lower end of each screw is one element of a clutch, the other element being carried by the torque transmitting device which is raised by depression of a treadle to engage the clutch element on the screw. Having placed a shoe on the pad at the loading station, the operator depresses the treadle to engage the clutch, whereupon the abutments move down to apply pressure to the shoe. At this time, however, only sufficient current is applied to the magnetic torque transmitting device to press the shoe on the pad with a pressure which would not injure the operator should he inadvertently have a finger between the shoe and pad or between the abutments and shoe. After having applied preliminary pressure, the operator, while still holding the treadle depressed, places one hand on each of two widely separated switches closing of which supplies a predetermined additional amount of current to the torque transmitting device to apply final pressure to the shoe. The operator then releases the treadle for, if he does not, a switch remains open which prevents supplying current to turret rotating mechanism.

To initiate movement of the turret, two other hand switches are provided, one located adjacent to each of the pressure controlling switches, so that the operator, after applying pressure to the shoe, can, by slight movement of his hands, initiate movement of the turret provided the treadle is released.

Closing of the hand switches energizes a relay (called herein the "indexing relay") which closes a holding circuit for itself and opens or closes other switches, as will be indicated later.

The turret is provided with a ring gear meshing with which is a pinion on the shaft of one element of another torque transmitting device or indexing clutch similar to that referred to and preferably having its driving element driven by the same motor. Each quadrant of the turret is provided with a stop which engages a vertically movable indexing pin, the stop engaging the pin so locating the turret that one of the clutch elements on the screws is vertically alined with the clutch element on the first-described torque transmitting device, a very small amount of current being then supplied to the indexing clutch to hold the stop against the indexing pin. Operation of the indexing relay energizes a solenoid to withdraw the indexing pin. The stop acts at the end of its movement as a cam to close a switch in the circuit of the indexing relay so that the relay can be operated by the hand switches and, when the stop moves at the beginning of the indexing movement, the switch is opened to render the hand switches inoperative.

To insure that the turret will be moved slowly when it engages the stop, a third device, which in this case is an electromagnetic torque opposing device or brake, is provided. Another pinion meshing with the ring gear is carried by one element of the brake, the other element being stationary. Current supplied to this device will provide a braking or retarding effect proportional to the amount of current supplied. The indexing relay opens the circuit to the brake.

Two variable resistances, each controlled by a series of four cams on the turret, are provided, one in the line supplying current to the indexing clutch and the other in the circuit supplying current to the braking device so that, by suitably varying these resistances, the turret may be rapidly accelerated by supplying heavy current to the indexing clutch during the first part of its indexing movement while current to the brake is cut off and then, after about half of its indexing movement has occurred, by supplying current to the braking device and reducing the current to the indexing clutch the turret may be brought almost to rest before the stop on the turret engages the indexing pin. This result is effected by a relay controlled by a cam switch operated by one of a series of four identical cams on the turret. The switch is closed after the turret has moved 10° and opened after about 45° of movement of the turret as described. Closing of the cam switch energizes a relay which opens the circuit to the brake and opens the holding circuit for the indexing relay. While the cam switch is closed, full current is supplied to the indexing clutch to turn the turret rapidly without any braking effect and, when the cam switch opens, the brake circuit is cut in, to be controlled by its variable resistance, and the torque of the indexing clutch is under control of its variable resistance, the torque of the clutch and the braking effect being reduced together until near the end of the cycle when the braking effect becomes zero and only enough torque is given to the indexing clutch to hold the stop against the indexing pin.

When the turret stops, the variable resistance which controls the current to the indexing clutch will be passing very little current so that means is provided to by-pass this variable resistance and supply full current to the indexing clutch for quickly accelerating the turret during the initial part of its next movement. A switch for this purpose is closed when the indexing relay is energized.

These and other features of the invention will be more clearly understood from the following detailed description when read in connection with the accompanying drawings and will be pointed out in the appended claims.

Figure 1:
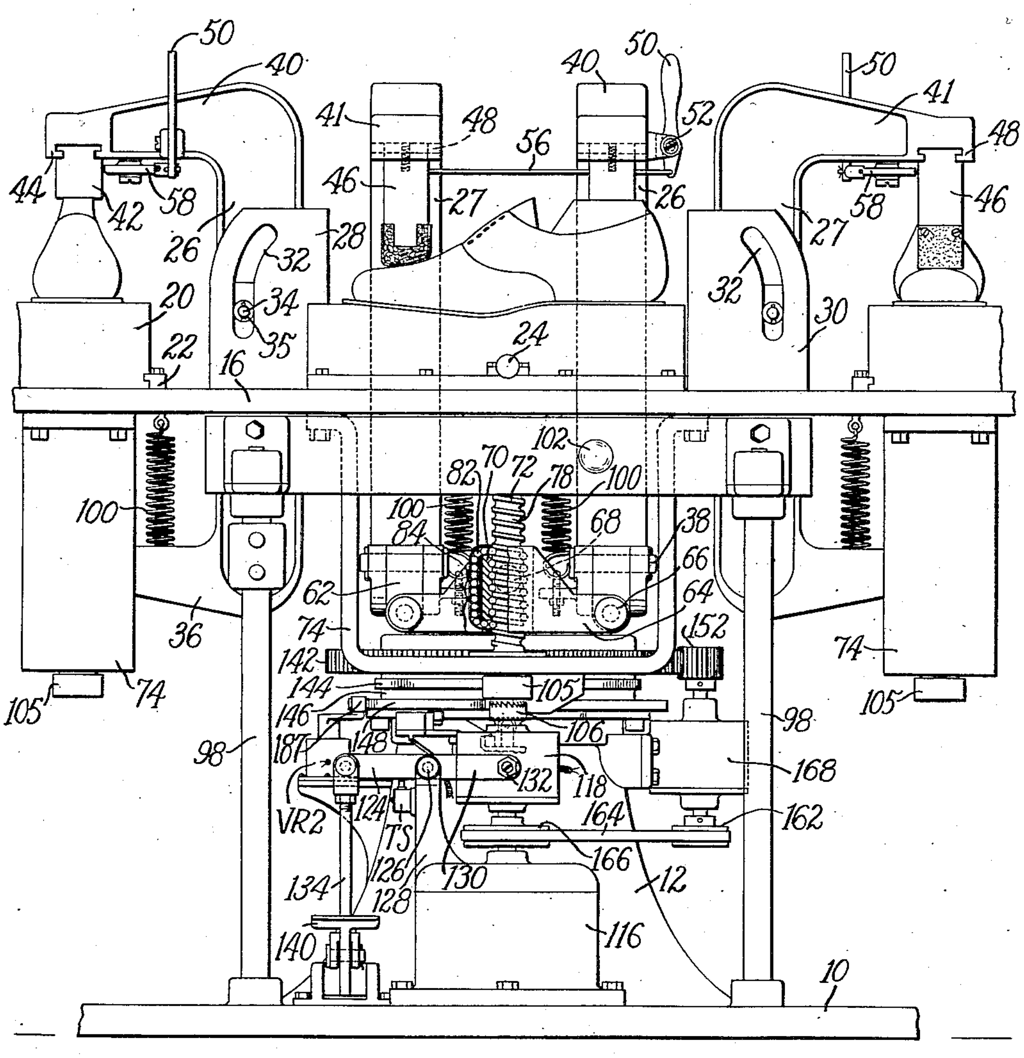
Fig. 1 is a front elevation of the machine, certain parts being partly in section.
Figure 3:
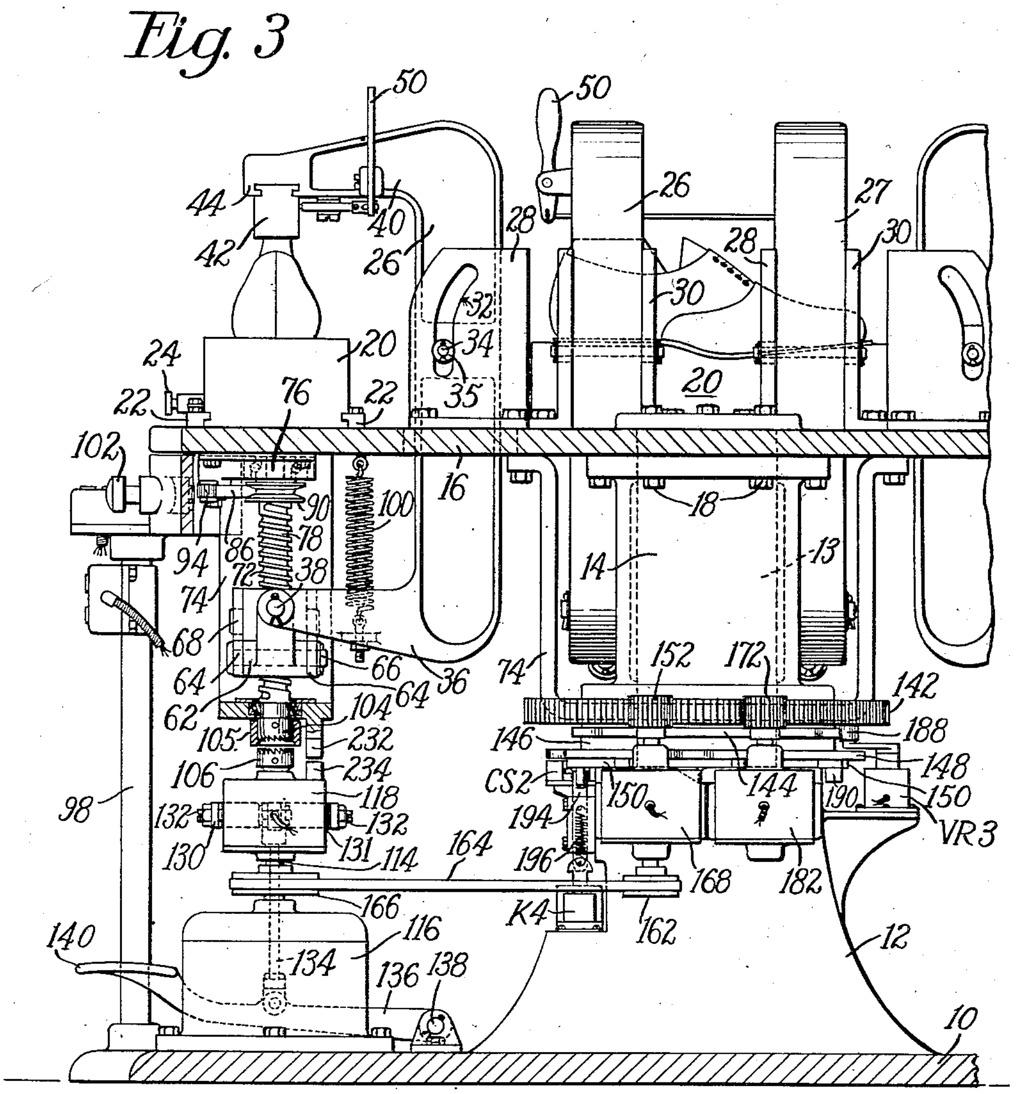
Fig. 3 is a side elevation of the machine, certain parts being in section.

Referring to Figs. 1 and 3, the machine comprises a base 10 on which is a column 12 the upper part 13 of which is cylindrical and is surrounded by a flanged sleeve 14 to which a turret 16 is fixed at 18, the turret and sleeve being rotatable about a vertical axis, that is, about the center of the cylindrical portion 13 of the column 12. Four pad boxes 20 of usual construction are mounted on the turret. The sides of the boxes have grooves which are engaged by ways 22 so that the boxes may be slid endwise into place and held by a spring pin 24 (Fig. 3) in a position which may be varied lengthwise of the pad.

At each station or pad a pair of C-shaped members 26, 27 embrace the pad box. Each of these members passes through a hole in the turret 16 and is guided for vertical and oscillating movements by plates 28, 30, one on each side of each of the members 26, 27, there being a slot 32 in each plate through which a pin 34 seated in the member passes. The pin has a roll 35 at each end engaging the slot 32 in one of the plates. The lower portions of the slots are vertical and the upper portions curve inwardly of the turret. Each of the members 26, 27 has a lower arm 36 the end of which is bifurcated and pivoted (Fig. 3) on a horizontal pin 38 which moves up and down, and therefore, as the pins 38 move up, the members 26, 27 at first move vertically upward and then inwardly of the turret, the motion of each being determined by the slots 32. In this manner the ends of upper arms 40, 41 of the members 26, 27 are moved out of position over the pad box to facilitate removal of the shoe. Mounted on the end of the arm 40 of the member 26 is an abutment 42 for the rear portion of a last, the abutment being guided for adjustment longitudinally of the shoe by a T-guide 44.

On the upper arm 41 of the member 27 (Fig. 1) is an abutment 46 for the toe end of the shoe, the abutment having a T-guide 48 extending longitudinally of the shoe and being adjustable in the guide by a handle 50 of a lever pivoted at 52 between its ends, its lower arm being connected to a rod 56 which, at its other end (Fig. 5), is connected to a lever 58 pivoted at 60 between its ends, the other end of the lever engaging a hole in the abutment 46 so that by manipulation of the handle 50 the toe abutment may be adjusted lengthwise of the pad.

The pins 38 (Fig. 3) by which the lower arms 36 of the members 26, 27 are pivoted pass through blocks 62 which are in turn pivoted one at each end of a double whiffletree 64 by horizontal pins 66 at right angles to the adjacent pins 38. Each part of the whiffletree is pivoted centrally between its ends at 68 to a nut 70 lying between them. A screw 72 passes through the nut 70 and is supported at its lower portion by a bearing in a U-shaped bracket 74 secured at its upper ends to the turret 16. The upper end of the screw (Fig. 3) has a bearing in a block 76 secured to the lower face of the turret 16. The screw has a helical groove 78 fitting half of a bearing ball and the nut 70 (Fig. 1) has a similar groove. In the grooves of the nut throughout their extent is a series of bearing balls 82 which serve as the thread of the screw, the balls being circulated through a by-pass 84 in the nut. This anti-friction screw is rotated in a clockwise direction, viewed from its top (Fig. 5), to draw down the whiffletree and operate the abutments to apply pressure equally to the two ends of the shoe.

To prevent reverse movement of the screw, a lever 86 (Fig. 4) is pivoted at 88 to the block 76 on the underside of the turret 16, the lever having a wedge-shaped end to engage a wedge-shaped groove in a circular disk 90 fixed to the screw near its upper end. The wedge end of the lever is urged to engage the groove in the disk 90 by a spring 92. The lever prevents counterclockwise movement of the screw but does not interfere with its clockwise movement.

On the end of the lever 86 is a roll 94 which, as a pad box approaches the loading station, engages a cam 96 fixed to upright posts 98 at the loading station and causes the lever 86 to release the disk 90 and allow tension springs 100 (Fig. 1) connected between the turret 16 and the lower arms 36 of the members 26, 27 to react and lift the abutments. When a pad is at the loading station, the roll 94 on the lever 86 has passed beyond the end of the cam 96 and the spring 92 can act to move the lever 86 against the disk 90.

To release the pressure on the shoe at the loading station at any time, the operator can push a knob 102 on the end of a spring plunger which engages the roll 94 on the lever 86 and knocks out its wedge end so that the abutments will be raised by the tension springs 100.

Figure 6:
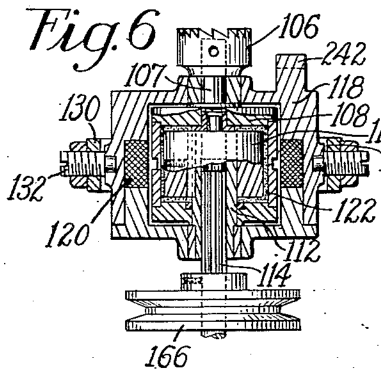
Fig. 6 is a view, mostly in section, of the torque transmitting device for applying pressure to the shoe.

The lower end of each screw 70 (Fig. 3) has fixed thereto one element 104 of a dog clutch which is surrounded by a bell-mouthed sleeve 105. The above-described mechanism is repeated for each of the other three pad boxes. The other element 106 of the dog clutch is fixed to a shaft 107 (Fig. 6) of a magnetic fluid, torque transmitting device. The shaft 107 is fastened to or made as part of a cage 108 inside of which is a core 110 splined to a sleeve 112 which, in turn, is splined to slide on a shaft 114 of a motor 116. The cage and core are enclosed in a casing 118 in which is a coil 120 surrounding the cage. A small space 122 between the cage and the core is filled with a mass of relatively movable, contiguous, discrete, ferromagnetic particles. Current supplied to the coil 120 causes the magnetic particles to become viscous or solid, depending upon the strength of the magnetic field produced by the curent in the coil, and causes the core and cage to rotate together, the amount of slippage between the cage and core depending upon the current supplied to the coil and the power of the motor 116.

To raise the casing 118 and cause the dog clutch elements 104, 106 to engage, a yoke lever 124 (Fig. 1) pivoted at 126 on a supporting bracket 128 has arms 130, 131 embracing the casing 118 and pivoted thereto at 132. A link 134 is pivoted to the lever 124 at one end and to a treadle lever 136 (Fig. 3) at the other end. The lever 136 is fulcrumed at 138 to the base 10 and has a treadle 140 depression of which will raise the casing 118 and cause the sleeve 112 to slide up on the shaft 114 and the clutch elements 104, 106 to engage so that, when the motor 116 is running and current is supplied to the coil 120 of the torque transmitting device, the screw will be turned and the abutments 42, 46 will first be swung over the shoes and then moved down vertically to apply pressure to the shoe, the pressure between the abutments being equalized by the whiffletree 64.

Figure 7:
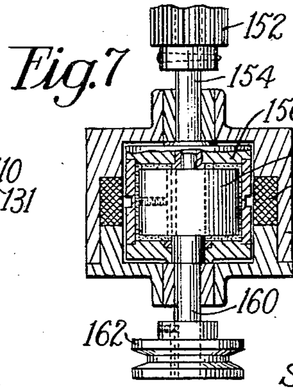
Fig. 7 is a view, partly in section, of a magnetic clutch for turning the turret.
Figure 9:
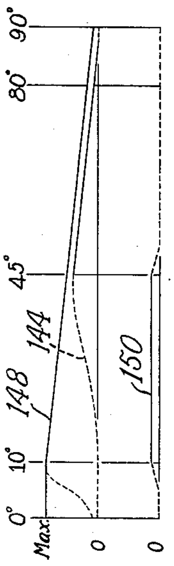
Fig. 9 is a development diagram of the three cams provided on each quadrant of the turret.

The turret 16 is mounted on the flanged sleeve 14 (Fig. 3) which in turn is secured to the ring gear 142. Below the ring gear and secured thereto is a series of four identical cams 144. Below this and separated therefrom by a spacer 146 is another series of four identical cams 148, and below this is another series of four identical cams 150 all arranged to turn with the turret about the column 13. The function of the cams, a development of which is shown in Fig. 9, will be later explained. In Fig. 9 full lines indicate the part of the cycle during which current is flowing to the devices operated by the cams. To turn the turret a pinion 152 (Fig. 3) meshing with the ring gear 142 is mounted on a shaft 154 (Fig. 7) secured to a cage 156 in which is a core 158 secured to a shaft 160. On the shaft is a pulley 162 connected by a belt 164 (Fig. 3) to a pulley 166 on the shaft 114 of the motor 116 which, during operation of the machine, is constantly driven. In the casing 168 of the clutch is a coil 170 and in the space between the cage and the core is powdered ferromagnetic material, as in the case of the clutch shown in Fig. 6. When current is supplied to the coil 170, the cage 156 and core 158 will be yieldingly connected and torque transmitted to the pinion 152 to turn the turret, the torque being proportional to the current.

Figure 8:
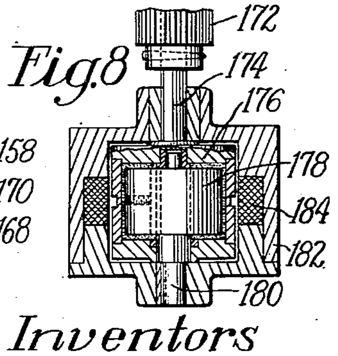
Fig. 8 is a view, partly in section, of the electromagnetic braking device.

After acceleration of the turret for a part of its quarter revolution, a brake is needed to decelerate it and bring it to a stop without shock. For this purpose the device shown in Fig. 8 is provided. A pinion 172 secured to a shaft 174 meshes with the ring gear 142. On the shaft 174 is a cage or rotor 176 inside of which is a core or stator 178 on a fixed shaft 180. The core and cage are enclosed in a casing 182 in which is a coil 184. The space between the cage and core is filled with powdered ferromagnetic material like that used in the clutches so that, when current is supplied to the coil 184, a drag or opposition to turning to the pinion will be produced, that is, a braking effect proportional to the current.

The casings 168, 182 (Fig. 3) are secured on the column 12 with their pinions 152, 172 meshing with the ring gear 142 on the turret. Two variable resistances VR2, VR3 of usual construction are provided, one for controlling the current in the coil 170 of the indexing clutch 168 and the other for controlling the current in the coil 184 of the brake 182. Each of the variable resistances has an arm 186 carrying a roll. The roll 187 of the variable resistance VR2 engages the cams 148 (Fig. 1) and the roll 188 of the variable resistance VR3 engages the cams 144 (Fig. 3).

Figure 4:
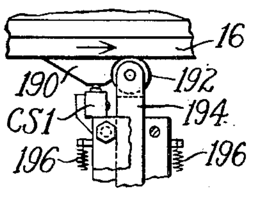
Fig. 4 is a detail of parts shown in Fig. 3.

On the lower side of the turret are four stop lugs 190 which, as shown in Fig. 4, engage at times a roll 192 on a vertically movable indexing pin 194 upheld by a tension spring 196. As each lug 190 approaches the roll 192 at the end portion of its movement, it acts as a cam to close a microswitch CS1. As shown in Fig. 3, the index pin is drawn down to permit movement of the turret by a solenoid K4.

Figure 10:
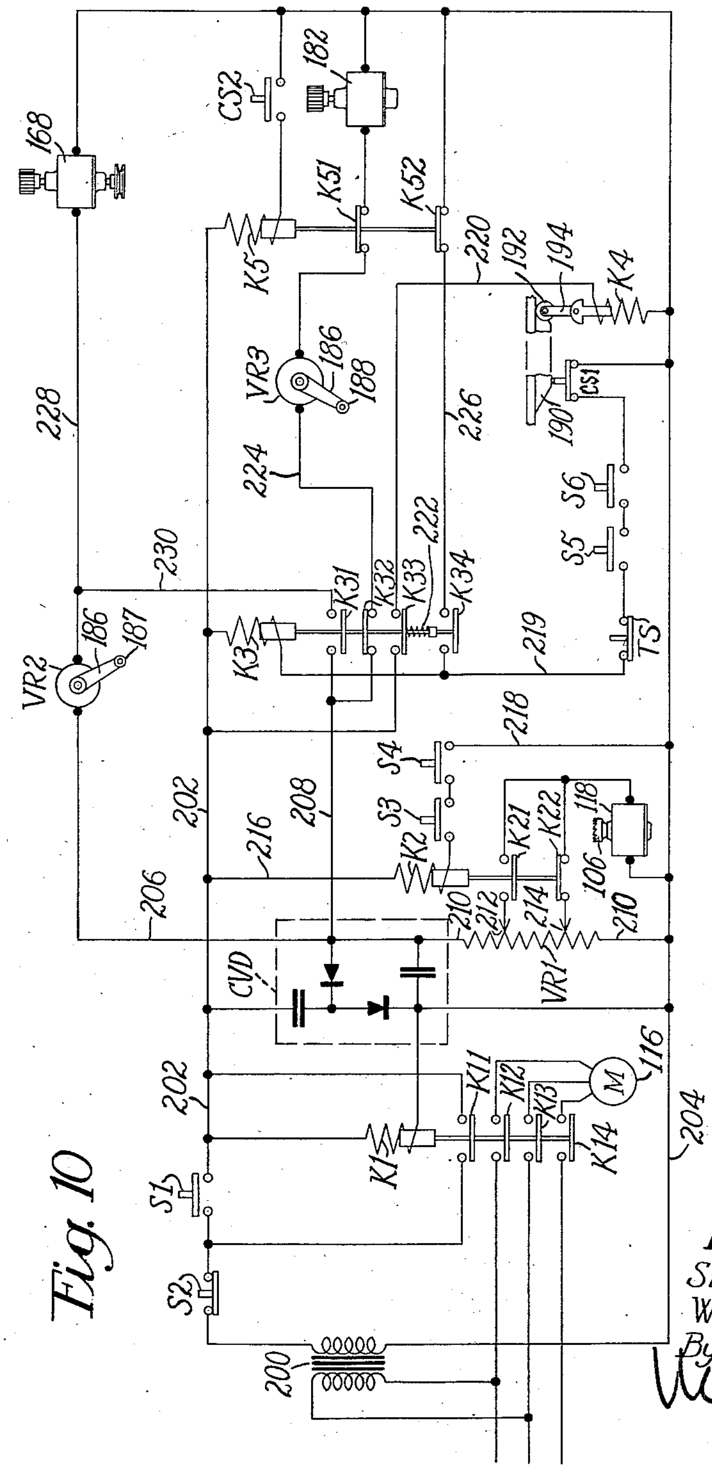
Fig. 10 is a wiring diagram of the electrical circuits.

Referring to Fig. 10, current from a 3-phase alternating source enters at the left, the central and one outer wire being connected to the primary of a transformer 200, the secondary being connected to lines 202, 204. Solenoids or relays are indicated at K1, K2, K3, K4 and K5, which are operated by alternating current. Hand-operated switches are indicated by S1, S2, S3, S4, S5 and S6. S1 is a starting switch and S2 a stopping switch. Closing of S1 operates the relay K1 to close a series of switches K11, K12, K13 and K14. The switch K11 by-passes current around the relay K1, and the others supply 3-phase current to the motor 116. Enclosed in dotted lines is an electrical apparatus known as a cascade voltage doubler CVD which transforms alternating current to direct current at twice the voltage. Direct current is thus supplied to the lines 206, 208, 210. In line 210 is a variable resistance VR1 having two adjustable points of contact 212, 214. As indicated in Fig. 10, current is passing through most of the resistance VR1, through closed switch K22 to the coil 120 of the magnetic clutch in the casing 118 so that when the treadle is depressed torque will be transmitted to the screw 72 to apply preliminary pressure to the shoe but not enough to injure the operator's hand or finger should it be between the shoe and pad.

Figure 5:
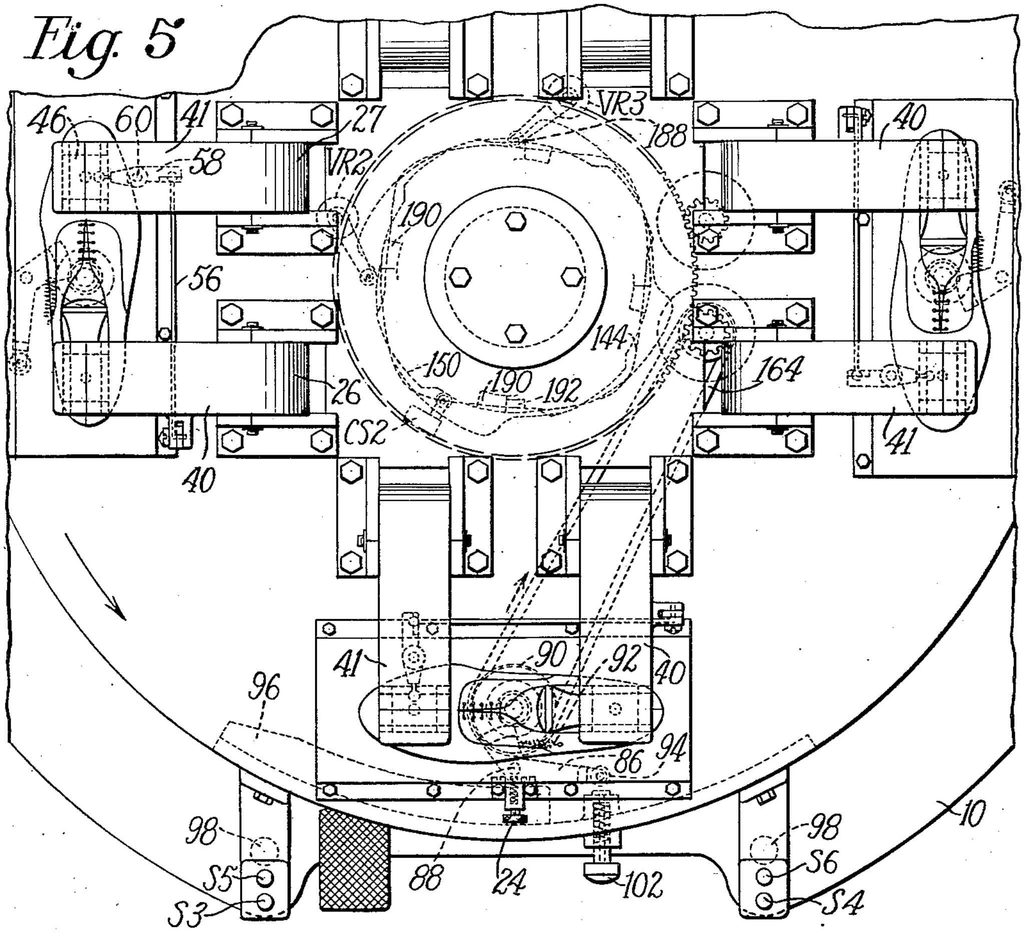
Fig. 5 is a partial plan view showing particularly the loading station.

The relay K2 is controlled by two hand switches S3, S4 separated, as shown in Fig. 5, so that both hands must be used to close them. When these are closed, K2 is energized through lines 216, 218 to open switch K22 and close switch K21. Current then passes through a small part of the resistance VR1 by way of switch K21 to the coil in the casing 118 to increase the torque of the clutch and cause heavy pressure to be applied to the shoe, which pressure is determined by the amount of current supplied. During this operation the treadle 140 is held depressed and a switch TS located as shown in Fig. 1 is held open by pressure of the lever 124 upon it, thus preventing any possibility of supplying current to the relay K3 which controls the indexing mechanism.

After final pressure has been applied to the shoe, the treadle 140 is released, allowing the treadle switch TS to close and the dog clutch 106 to be released. Now, by closing the hand switches S5 and S6 located as shown (Fig. 5) adjacent to the switches S3 and S4, the relay K3 is energized by current from the line 202, through K3, line 219, TS, S5, S6 and cam switch CS1, cam switch CS1 being held closed by the abutment 190. Operation of the relay K3 first closes a yieldingly supported switch K33 which supplies current from line 202 through switch K33, line 220, to solenoid K4 which withdraws the indexing pin 194. Later a spring 222 under switch K33 is compressed, switch K32 is opened and switches K34 and K31 are closed. Opening of switch K32 prevents current passing through line 224 to the variable resistance VR3 controlling the brake 182. Closing of switch K34 completes a holding circuit through line 226 and switch K52 to keep K3 energized after switches S5 and S6 are opened.

When the turret comes to rest a very small current is being supplied from line 206 through variable resistance VR2 and line 228 to the magnetic clutch 168 to hold one of the stops 190 in contact with the roll 192 of the indexing pin. Therefore variable resistance VR2 has to be by-passed to supply sufficient current to the indexing clutch 168 to index the turret. This is accomplished by closing of switch K31 through which full current flows from line 208, switch K31, line 230 and line 228 to the magnetic clutch 168, quickly to accelerate the turret.

After the turret is turned about 10° one of the four cams 148 will have operated variable resistance VR2 to allow passage of full current through it so that line 230 and switch K31 are no longer needed. At this point cam switch CS2 is closed by one of the four cams 150 and held closed during 35° further rotation of the turret, that is, 45° from the start of the turret. Closing the switch CS2 energizes relay K5 to open switches K51 and K52. Switch K51 cuts off current through the brake 182 and opening of switch K52 opens the holding circuit for K3, causing switches K31, K33 and K34 to open and switch K32 in the brake circuit to close. After about 45° movement of the turret, cam switch CS2 opens, de-energizing K5 and allowing the switches K51 and K52 to close, thus completing the brake circuit through switches K32 and K51 in line 224, current through which is then under control of VR3 which is operated by one of the four cams 144 to apply the brake while current to the indexing clutch 168 is gradually reduced by cam 148, the torque of the indexing clutch and the braking effect being gradually reduced together so that, when the stop lug 190 approaches the indexing pin 194 which has been raised by the springs 196 upon opening of the switch K33, the brake circuit is cut out by its cam and a slight current still applied to the indexing clutch 168 to bring the stop against the indexing pin without shock and hold it there. Also, the stop 190 then engages the microswitch CS1 and holds it closed so that the switches S5, S6 are operative to recycle the turret if desired, provided the treadle is not depressed.

Figure 2:
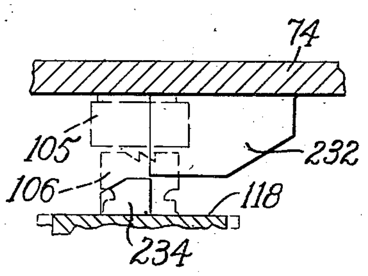
Fig. 2 is a detail of parts shown in Fig. 3.

Should the treadle be depressed by accident or otherwise during rotation of the turret, one of four cams 232 mounted on the brackets 74 (Figs. 2 and 3) will engage a projection 234 on the casing 118 and depress it far enough to cause the sleeve 105 around the clutch element 104 to clear the other element 106. When the dog clutch elements are alined, that is, when the turret is properly indexed, the cam 232 is clear of the projection 234 to permit raising of the casing 118 and engagement of the dog clutch.

To use the machine, the switch S1 is closed to energize relay K1 which closes switch K11 and the three motor switches to start the motor 116. Current from the cascade voltage doubler CVD through line 210, through most of the resistance VR1 and switch K22 causes enough magnetic flux to be supplied to the clutch 118 to cause actuation of the screw 72 when the treadle is depressed. The operator places a shoe on the pad and depresses the treadle 140 to rotate the screw. The pad swings over the shoe and descends to press the shoe on the pad. Since the clutch 118 is supplied with current through most of the resistance VR1, the pressure applied will be insufficient to injure the operator should his fingers or hand be between the shoe and the pad or abutment. Reverse turning of the screw to release the pressure is prevented by the lever 86 and, if desired, this preliminary pressure may be released by allowing the treadle to rise and pushing the knob 102.

Supposing the preliminary pressure to be satisfactorily applied, the operator places a hand on each of the switches S3, S4 and holds them both depressed, thus energizing relay K2 which closes switch K21 and opens switch K22, cutting out most of the resistance VR1 and causing full pressure to be applied, which pressure will be proportional to the current, that is, to the location of the point 214 on the resistance VR1. While the treadle is depressed, the treadle switch TS to line 219 is held open. The treadle is now released, causing switch TS to close. Switch CS1 is already closed by the abutment 190 so that depression of the widely separated switches S5 and S6 for an instant by both hands of the operator energizes relay K3 to cause closing of switch K33 which energizes solenoid K4 to pull the indexing pin 194. It then closes switch K34 to hold relay K3 when the switches S5 and S6 are released. At the same time relay K3 opens switch K32 to cut out current to the brake 182 and closes switch K31 to by-pass resistance VR2 and supply full current to the clutch 168 to turn the turret. After about 10° movement of the turret, the cam 150 on the turret closes switch CS2, energizing relay K5 which opens switch K52 to open the holding circuit for relay K3 and opens switch K51 to prevent current from going to the brake 182 after relay K3 is de-energized and switch K32 is closed. The cam 148 has now moved the variable resistance VR2 to supply full current to the clutch 168 so that switch K31 can be opened to allow the index pin to rise so that its roll engages the underside of the turret 16 in the path of the next abutment 190. The switch CS1 is now opened so that switches S5 and S6 are inoperative. After the turret has turned through about 45° the cam 150 allows switch CS2 to open, de-energizing relay K5 and allowing switch K51 and switch K52 to close. Since K32 is now closed, the current supplied to the brake is under control of variable resistance VR3 operated by cam 144 which at this point will apply its full braking effect. The cam 144 will gradually reduce this effect to zero near the end of the cycle and the cam 148 will reduce the current to the clutch 168 so that the torque of the indexing clutch will be only sufficient to hold the abutment 190 against the roll 192 on the indexing pin.

Should the treadle 140 be depressed accidentally or otherwise while the turret is in motion, no harm will be done because near the end of the cycle the cam 232 on the turret will engage the projection 234 on the casing 118 and push the casing down positively far enough so that the dog clutches 104, 106 cannot hit each other. When the end of the indexing movement is reached by the turret, the cam 232 is beyond tlhe projecting 234 so that depression of the treadle will cause the clutch element 106 to engage the clutch element 104.

Having thus described our invention, what we claim as new and desire to secure by Letters Patent of the United States is:

1. In a machine for applying pressure to shoes, the combination of a pad, abutments for the shoe, means for relatively moving the pad and abutments including a screw, a motor, and electromagnetic power transmitting means of the ferro-magnetic type connecting the motor to the screw.

2. In a machine for applying pressure to shoes, a pad, abutments movable to apply pressure to a shoe on the pad, a screw for moving the abutments, a motor, and electromagnetic power transmitting means of the ferromagnetic type connecting the motor to the screw.

3. In a machine for applying pressure to shoes, the combination of a pad, abutments for the shoe, means for relatively moving the pad and abutments including an antifriction screw, manually releasable means for preventing rotation of the screw in one direction, a motor, and electromagnetic means for connecting the motor to the screw to rotate it in the other direction.

4. In a machine for pressing soles on shoes, a pad, abutments for engaging the shoe, means including a magnetic fluid clutch for relatively moving the pad and abutments to apply pressure to the shoe, and a motor for driving the clutch.

5. In a machine for pressing soles on shoes, a pad, abutments for engaging the shoe, means including an electromagnetic clutch for relatively moving the pad and abutments to apply pressure to the shoe, a motor for driving the clutch, a large resistance through which current is supplied initially to the clutch to apply preliminary pressure to the shoe, and operator-controlled means for reducing the resistance to supply heavy current to the electromagnetic clutch.

6. In a machine for applying pressure to shoe bottoms, the combination of a pad, abutments over the pad movable to apply pressure to the shoe on the pad, screw means connected to the abutments, a motor, an electromagnetic torque transmitting clutch between the motor and the screw, and operator-controlled means for varying the torque of the clutch.

7. In a machine for applying pressure to shoe bottoms, the combination of a pad, abutments for the shoe, means for relatively moving the pad and abutments including a screw, a magnetic clutch for operating the screw, power means for operating the clutch, a treadle depression of which connects the clutch to the screw, means for supplying enough current to the clutch to apply initial pressure to the shoe not injurious to the operator, and widely separated hand switches closing of which supplies enough current to the clutch to cause heavy pressure to be applied to the shoe.

8. In a machine for applying pressure to shoe bottoms, the combination of a pad, an abutment for each end of the shoe, a whiffletree having each end connected to one of the abutments, a nut pivoted to the whiffletree between its ends, a screw passing through the nut and held from endwise movement, and means for turning the screw to move the abutment toward the shoe.

9. A machine according to claim 8 in which the thread of the screw is formed by a series of bearing balls.

10. A machine according to claim 8 in which a peripherally grooved disk is mounted on the screw, and a lever having a wedge-shaped end engages said groove to prevent reverse movement of the screw.

11. In a machine for applying pressure to shoe bottoms, a pad, an abutment for each end of the shoe, C-shaped members each carrying an abutment, a plate having a curved slot therein adjacent to each C-shaped member, a pin anchored in each C-shaped member engaging said slot, and means connected to the lower arms of the C-shaped members to draw them down, the pins and slots first causing the abutments to move laterally of the shoe over the shoe and then down to press the shoe upon the pad.

12. In a machine for applying pressure to shoe bottoms, the combination of a pad to receive a shoe, abutments for the shoe, the pad and abutments being relatively movable heightwise of the shoe to apply pressure thereto, a ball-bearing screw rotation of which effects such relative movement, means for rotating the screw, and a wedge-shaped member engaging a complemental groove in the screw to prevent reverse movement of the screw.

13. In a machine for applying pressure to shoe bottoms, the combination of a pad to receive a shoe, abutments for the shoe, the pad and abutments being relatively movable heightwise of the shoe to apply pressure thereto, a ball-bearing screw for effecting such relative movement, manually releasable means to prevent rotation of the screw in one direction, a clutch element on the screw, power-operated means having a clutch element to engage that on the screw, and manually operated means for causing said clutch elements to engage each other to rotate the screw in the other direction.

14. In a machine for pressing soles on shoes, a pad, abutments for the shoe, an antifriction screw for relatively moving the pad and abutments to apply pressure to the shoe, an electromagnetic clutch for operating the screw, a motor connected to the clutch, a large resistance through which current is supplied to the clutch to cause light preliminary pressure to be applied to the shoe, and widely separated hand switches by closing of which the resistance is reduced and sufficient current is supplied to the electromagnetic clutch to cause heavy pressure to be applied to the shoe.

15. In a machine for pressing soles on shoes, a pad, abutments for the shoe, an antifriction screw for relatively moving the pad and abutments to apply pressure to the shoe, an electromagnetic clutch for operating the screw, a motor connected to the clutch, a normally closed first switch through which a small current is supplied to the electromagnetic clutch to apply a light preliminary pressure to the shoe, a second switch closing of which applies a heavy current to the electromagnetic clutch to apply a predetermined sole attaching pressure to the shoe, a solenoid energizing of which opens the first switch and closes the second switch, and two widely separated hand switches closing of which energizes the solenoid.

16. In a machine for applying pressure to shoe bottoms, the combination of a pad to receive a shoe, abutments for the shoe, the pad and abutments being relatively movable heightwise of the shoe to apply pressure thereto, a ball-bearing screw rotation of which effects such relative movement, a clutch element on the screw, a second clutch element to engage that on the screw, manually operated means for causing said clutch elements to engage each other, power-operated means, ferro-magnetic means between the power-operated means and the second clutch element for transmitting torque to the clutch element, and manually operated means for causing excitation of said ferro-magnetic means.

17. In a machine for operating on shoes, the combination of a carrier, a plurality of operating instrumentalities on the carrier movable past a loading station, a screw for operating each instrumentality, means at the loading station for engaging each screw in turn as it arrives at said loading station by movement of the carrier, power-operated means, rotary electromagnetic means between said engaging means and said power-operated means, and means to supply current to said electromagnetic means whereby the torque transmitted to said screw by said power-operated means is proportional to the current supplied to the electromagnetic means.

18. In a machine for operating on shoes, the combination of a turret rotatable about a vertical axis, pads on the turret, means for applying pressure to shoes on the pads as the pads are presented at a loading station by movement of the turret, power-operated means adjacent to the turret, rotary means connected to the turret for advancing the turret, and a magnetic fluid clutch between the power-operated means and the rotary means for connecting one to the other.

19. In a machine for operating on shoes, the combination of a turret rotatable about a vertical axis, pads on the turret, means for applying pressure to shoes on the pads as the pads are presented at a loading station by movement of the turret, rotary means for engaging the turret, power-driven means adjacent to the rotary means, small particles of ferro-magnetic material between said rotary means and said power-driven means providing a magnetic fluid clutch, and means for applying a magnetic field to said magnetic material to cause the rotary means to be driven by said power-driven means.

20. In a shoe machine, a turret rotatable about a vertical axis, a plurality of work receiving units on the turret, a driven member connected to the turret, a driving member, ferro-magnetic particles between the driving and driven members, and means for subjecting said ferro-magnetic particles to an electric field to connect the driving and driven members.

21. In a shoe machine, a conveyor, a plurality of work receiving units on the conveyor, a driven member connected to the conveyor, a driving member, ferro-magnetic particles between the driving and driven members, means for subjecting said ferro-magnetic particles to an electric field to connect the driving and driven members, an electromagnetic brake connected to the conveyor comprising a stator and a rotor having between them ferro-magnetic particles, means for subjecting the magnetic particles to an electric field, and means for varying said fields to cause the conveyor first to move rapidly and then slowly.

22. In a shoe machine, the combination of a conveyor, a plurality of work receiving units on the conveyor, a constantly driven magnetic clutch connected to the conveyor, a first variable resistance through which current is supplied to the magnetic clutch to move the conveyor, an electromagnetic brake connected to the conveyor, a second variable resistance through which current is supplied to the brake, and means on the conveyor for varying the said variable resistances to control movement of the conveyor.

23. In a machine for applying pressure to shoe bottoms, a carrier, pads on the carrier, means for applying pressure to shoes on the pads as they are presented in turn at a loading station, an electromagnetic clutch connected to the carrier, an electromagnetec brake connected to the carrier, and means operated by the carrier for varying the magnetization of the clutch and brake to move the carrier through a predetermined distance and bring it substantially to rest.

24. In a machine for applying pressure to shoe bottoms, a carrier, pads on the carrier, means for applying pressure to shoes on the pads as they are presented in turn at a loading station, an electromagnetic clutch connected to the carrier, an electromagnetic brake connected to the carrier, means operated by the carrier for varying the magnetization of the clutch and brake to move the carrier through a predetermined distance and bring it substantially to rest, stops on the carrier, an indexing pin engageable with the stops, a solenoid for withdrawing the pin, and separated hand switches for causing operation of the solenoid.

25. In a shoe machine, a conveyor, a plurality of work receiving units on the conveyor, a driven member connected to the conveyor, a driving member, ferro-magnetic particles between the driving and driven members, means for subjecting said ferro-magnetic particles to an electric field to connect the driving and driven members, an electro-magnetic brake connected to the conveyor comprising a stator and a rotor having between them ferro-magnetic particles, means for subjecting the magnetic particles to an electric field, and means operated by the conveyor for varying said fields to cause the conveyor first to move rapidly and then slowly.

26. In a machine for applying pressure to shoe bottoms, a carrier, pads on the carrier, means for applying pressure to shoes on the pads as they are presented in turn at a loading station, power-driven means for the carrier, electromagnetic means between the power-driven means and the carrier, connections including a variable resistance, a cam on the carrier for controlling current supplied to said electromagnetic means to cause movement of the carrier, means for by-passing said variable resistance to supply full current to said electromagnetic means during the first part of said carrier movement, and means for opening said by-pass circuit, the cam being then effective to gradually reduce the current to the end of the carrier movement.

27. In a machine for pressing shoe work, the combination comprising a carrier having a plurality of presses thereon to be presented in turn at a loading station by movement of the carrier, means at the loading station for operating the presses in turn to put a shoe under pressure, a power-driven magnetic clutch for moving the carrier, a first variable resistance for controlling current to said clutch, a cam on the carrier for operating the first variable resistance, a magnetic brake connected to the carrier, a second variable resistance in the circuit of the magnetic brake, and a second cam on the carrier for operating the second variable resistance, said variable resistances being varied to cause the carrier to move rapidly at first and then come almost to a stop.

28. In a machine for applying pressure to shoes, a carrier, pads on the carrier, means for applying pressure to shoes on the pads at they are presented in turn at a loading station, a constantly rotated member, a member associated therewith connected to the carrier and normally unconnected to the rotating member, ferro-magnetic particles between the members, means for magnetizing the particles to cause the carrier to be advanced, a brake having a rotor and a stator one fixed and the other connected to the carrier, ferro-magnetic particles between the rotor and the stator, means for magnetizing the particles to produce a braking effect upon the carrier, and separate means each controlled by movement of the carrier for respectively varying the magnetization of the ferro-magnetic particles to first move the carrier rapidly and then bring it substantially to a stop.

29. In a shoe machine, the combination of a conveyor, a plurality of work receiving units on the conveyor, a constantly driven magnetic clutch connected to the conveyor, a first variable resistance through which current is supplied to the magnetic clutch to move the conveyor, an electromagnetic brake connected to the conveyor, a second variable resistance through which current is supplied to the brake, means on the conveyor for varying the said variable resistances to control movement of the conveyor, stops on the conveyor, an indexing pin in the path of said stops, a first solenoid for operating switches for withdrawing the indexing pin, for holding the solenoid in operation when the manual control is released, for opening the circuit to the brake and for by-passing the first variable resistance to apply full current to the magnetic clutch, hand-operated switches controlling said first solenoid, a second solenoid controlled by movement of the conveyor for operating the switches to release the first solenoid and open the brake circuit, movement of the conveyor releasing said second solenoid after the conveyor has moved about half the distance from its initial position to the indexing pin, and a switch in circuit with the hand switches which is closed by a stop on the conveyor when the conveyor stops and opened early in the conveyor movement.

30. In a shoe machine, the combination of a conveyor, a plurality of work receiving units on the conveyor, a constantly driven magnetic clutch connected to the conveyor, a first variable resistance through which current is supplied to the magnetic clutch to move the conveyor, an electromagnetic brake connected to the conveyor, a second variable resistance through which current is supplied to the brake, means on the conveyor for varying the said variable resistances to control movement of the conveyor, a manually controlled solenoid for operating switches, for holding the solenoid in operation when the manual control is released, for opening the circuit to the brake and for by-passing the first variable resistance to apply full current to the magnetic clutch, and a second solenoid controlled by movement of the conveyor for operating the switches to release the first solenoid and open the brake circuit, movement of the conveyor releasing said second solenoid after substantial movement of the conveyor.

31. In a machine for applying pressure to shoe bottoms, the combination of a carrier, pads on the carrier to be presented in turn at a loading station by movement of the carrier, abutments movable to apply pressure to a shoe on the pad at the loading station, a screw having screw-traversing ball bearings rotation of which moves the abutments toward the shoe, an electromagnetic clutch, a motor connected thereto, a dog clutch one element of which is on the screw and the other on the electromagnetic clutch, means for engaging the dog clutch elements, two electric switches separated a sufficient distance to require the use of both hands of the operator to close them, thus applying current to the electromagnetic clutch to cause rotation of the screw, a second electromagnetic clutch connected to the carrier and driven by said motor, a switch controlling supply of current to the second magnetic clutch, and means for opening the last-mentioned switch when the dog clutch is engaged.

32. In a machine for applying pressure to shoe bottoms, the combination of a carrier, pads on the carrier to be presented in turn at a loading station by movement of the carrier, abutments movable to apply pressure to a shoe on the pad at the loading station, a screw rotation of which moves the abutments toward the shoe, an electromagnetic clutch, a motor connected thereto, a clutch one element of which is on the screw and the other on the electromagnetic clutch, means for engaging the clutch elements, two electric switches separated a sufficient distance to require the use of both hands of the operator to close them, thus applying current to the electromagnetic clutch to cause rotation of the screw, a second electromagnetic clutch connected to the carrier and driven by said motor, a switch controlling supply of current to the second magnetic clutch, and means for opening the last-mentioned switch when the said clutch elements are engaged.

33. In a machine for applying pressure to shoe bottoms, a carrier, pads on the carrier, means for applying pressure to shoes on the pads as they are presented in turn at a loading station, power-driven means for the carrier, electromagnetic means between the power-driven means and the carrier, connections including a variable resistance, a cam on the carrier for controlling current supplied to said electromagnetic means through said variable resistance to cause movement of the carrier, means for by-passing said variable resistance to supply full current to said electromagnetic means during the first part of said carrier movement, means for opening said by-pass circuit, the variable resistance being then effective to gradually reduce the current to the end of the carrier movement, an electromagnetic brake connected to the carrier, a second variable resistance through which current is supplied to the brake, and a second cam on the carrier for gradually cutting in said second resistance during the final part of said carrier movement.

34. In a machine for pressing shoe work, the combination of a carrier having a plurality of presses thereon to be presented in turn at a loading station by movement of the carrier, means at the loading station for operating the presses in turn to put a shoe under pressure, means for advancing the carrier comprising a magnetic clutch having a driving member and a driven member, the driven member being connected to the carrier to advance it, magnetic particles between the driving and driven members, a first coil surrounding the driving and driven members, operator-controlled means for supplying current to the coil to cause the carrier to move, a brake connected to the carrier having a rotor and a stator with magnetic particles between them, a second coil surrounding the stator and the rotor, means for supplying current to the second coil, a variable resistance in the circuit of the first coil, a variable resistance in the circuit of the second coil, and cams on the carrier for operating each of said variable resistances to cause the carrier to be moved rapidly under the influence of the magnetic clutch and then under the influence of the brake to bring the carrier substantially to rest.

35. In a machine for operating on shoes, the combination of a carrier, a plurality of operating instrumentalities on the carrier movable past a loading station, a screw for operating each instrumentality, means at the loading station for engaging each screw in turn as it arrives at said loading station by movement of the carrier, power-operated means, rotary electromagnetic means between said engaging means and said power-operated means, means to supply current to said electromagnetic means whereby the torque transmitted to said screw by said power-operated means is proportional to the current supplied to the electromagnetic means, a second rotary electromagnetic means having driving and driven elements, the driven element being connected to the carrier and the driving element to the power-operated means, ferro-magnetic particles between the driving and driven elements, a coil for producing a magnetic field in said particles to cause torque to be transmitted by said driving element to said driven element, and means controlled by movement of the carrier for varying said field.

36. In a shoe machine, the combination of a conveyor, a plurality of work receiving units on the conveyor, a constantly driven magnetic clutch connected to the conveyor, a first variable resistance through which current is supplied to the magnetic clutch to move the conveyor, an electromagnetic brake connected to the conveyor, a second variable resistance through which current is supplied to the brake, means on the conveyor for varying the said variable resistances to control movement of the conveyor, stops on the conveyor, an indexing pin in the path of said stops, a manually controlled solenoid for operating switches for withdrawing the indexing pin, for holding the solenoid in operation when the manually controlled solenoid is released, for opening the circuit to the brake and for by-passing the first variable resistance to apply full current to the magnetic clutch, a second solenoid controlled by movement of the conveyor for operating the switches to release the first solenoid and open the brake circuit, and means on the conveyor for releasing said second solenoid after the conveyor has moved about half the distance from its initial position to the indexing pin.

37. In a sole attaching machine, the combination of a turret rotating about a vertical axis, pads on the turret to be presented in turn at a loading station by rotation of the turret, shoe abutments above the pads, antifriction screw means for moving the abutments toward the pads, power-driven means at the loading station adjacent to which each screw means is presented by rotation of the turret, and means including a magnetic clutch for connecting said power-driven means to the screw means.

38. In a sole attaching machine, the combination of a turret rotating on a vertical axis, pads on the turret to be presented in turn at a loading station by rotation of the turret, shoe abutments above the pads, antifriction screw means for moving the abutments toward the pads, power-driven means at the loading station adjacent to which each screw means is presented by rotation of the turret, means including a magnetic clutch for connecting said power-driven means to the screw means for operating the abutments at the loading station to apply pressure to a shoe, a ring gear on the turret, a pinion meshing with the ring gear, a cage connected with the pinion, a power-driven core in said cage, ferro-magnetic material between the cage and the core, and manually controlled means for magnetizing said magnetic material to connect the pinion to the power-driven means.

39. In a machine for applying pressure to shoes, the combination of a turret rotatable about a vertical axis, a plurality of pads on the turret, means for pressing shoes on the pads, a ring gear on the turret, a variable resistance, a series of cams on the ring gear corresponding to the number of pads, said cams controlling said variable resistance, a magnetic clutch connected to the ring gear and having its torque controlled by said variable resistance to turn the turret first rapidly and then bring it substantially to rest, and means for by-passing the variable resistance to supply full current to the magnetic clutch to again turn the turret.

40. In a machine for applying pressure to the shoe bottoms, a turret, pads on the turret, means for applying pressure to shoes on the pads, as they are presented in turn at a loading station by rotation of the turret, a ring gear on the turret, a pinion engaging the ring gear, a rotor secured to the pinion, a stator embraced by the rotor, ferro-magnetic material in a comminuted state between the stator and rotor, a coil adjacent to said magnetic material to produce a magnetic field therein, and means controlled by rotation of the turret for varying the strength of the magnetic field.

41. In a machine for applying pressure to shoe bottoms, a turret rotatable about a vertical axis, pads on the turret, means for applying pressure to shoes on the pads as they are presented in turn at a loading station by rotation of the turret, a ring gear on the turret, a pinion engaging the ring gear, closely spaced rotary elements one on the pinion and the other power driven, relatively movable contiguous discrete ferromagnetic particles between said elements, and means for applying a magnetic field to said elements and said magnetic material to cause the turret to be driven.

42. In a machine for applying pressure to shoes, the combination of a turret rotatable about a vertical axis, a plurality of pads on the turret, pressure applying means for each pad including a screw, means for rotating the turret to present each pad at a loading station, power-operated means at the loading station for operating each screw in turn and for turning the turret, electromagnetic means for connecting the power-operated means to the screw, and electromagnetic means for connecting the power-operated means to the turret.

43. In a machine for applying pressure to shoes, the combination of a turret rotatable about a vertical axis, a plurality of pads on the turret, pressure applying means for each pad including a screw, power-operated means, a plurality of magnetic clutches one between the power-operated means and the screw and the other between the power-operated means and the turret for rotating the turret, a treadle at the loading station for connecting one of the magnetic clutches to the screw, a switch controlling the said other magnetic clutch, and means operated by the treadle for opening said switch to prevent operation of the said other magnetic clutch when the treadle is operated.

44. In a machine for applying pressure to shoes, the combination of a turret rotatable about a vertical axis, a plurality of pads on the turret, pressure applying means for each pad, a ring gear on the turret, a magnetic clutch having a pinion meshing with the ring gear, a magnetic brake having a pinion meshing with the ring gear, circuits supplying current to the magnetic clutch and the magnetic brake, a variable resistance in each circuit, and cams on the turret to control current supplied to said magnetic clutch and the magnetic brake.

45. In a machine for applying pressure to shoes, the combination of a turret rotatable about a vertical axis, a plurality of pads on the turret, means for pressing shoes on the pads, a ring gear on the turret, a variable resistance, a series of cams on the ring gear corresponding to the number of pads, said cams controlling said variable resistance, and a magnetic clutch connected to the ring gear and having its torque controlled by said variable resistance to turn the turret first rapidly and then bring it substantially to rest.

46. In a machine for applying pressure to shoes, the combination of a turret rotatable about a vertical axis, a plurality of pads on the turret, means for pressing shoes on the pads, a ring gear on the turret, a variable resistance, a series of cams on the ring gear corresponding to the number of pads, said cams controlling said variable resistance, a magnetic clutch connected to the ring gear and having its torque controlled by said variable resistance to turn the turret first rapidly and then bring it substantially to rest, a magnetic brake having a pinion meshing with the ring gear, a second variable resistance in the brake circuit, and a second series of identical cams equal to the number of pads carried by the turret, said cams operating said variable resistances to cause the turret to be at first accelerated and then slowed down almost to a stop.

47. In a machine for applying pressure to shoes, the combination of a turret rotatable about a vertical axis, a plurality of pads on the turret, means for pressing shoes on the pads, a ring gear on the turret, a variable resistance, a series of cams on the ring gear corresponding to the number of pads, said cams controlling said variable resistance, a magnetic clutch connected to the ring gear and having its torque controlled by said variable resistance to turn the turret first rapidly and then slowly, means for by-passing said variable resistance to start the turret, a magnetic brake having a pinion meshing with the ring gear, a second variable resistance in the brake circuit, a second series of identical cams equal to the number of pads carried by the turret, said cams operating said second variable resistance to control the brake to cause the turret to be slowed down almost to a stop, an indexing pin, and positive stops on the turret for engaging said pin when the turret is moving slowly, said first-mentioned cams allowing only enough current to pass through the variable resistance which controls the magnetic clutch to hold the stop against the pin, the current supplied by the variable resistance in the brake circuit being reduced to zero.

References Cited in the file of this patent

UNITED STATES PATENTS

| | | |
|---|---|---|
| 376,406 | Coy | Jan. 10, 1888 |
| 584,590 | Horton | June 15, 1897 |
| 707,326 | Hornby | Aug. 19, 1902 |
| 902,491 | Ireland | Oct. 27, 1908 |
| 1,993,413 | Mellon | Mar. 5, 1935 |
| 2,251,285 | Kamborian | Aug. 5, 1941 |
| 2,263,673 | Brauner | Nov. 25, 1941 |
| 2,422,905 | Jackson | June 24, 1947 |
| 2,441,505 | Ochtman | May 11, 1948 |
| 2,447,439 | Thompson | Aug. 17, 1948 |
| 2,469,269 | Lear | May 3, 1949 |
| 2,573,065 | Salemme | Oct. 30, 1951 |
| 2,621,348 | Gross | Dec. 16, 1952 |
| 2,623,403 | Terdina | Dec. 30, 1952 |
| 2,650,360 | Nardone | Sept. 1, 1953 |

FOREIGN PATENTS

| | | |
|---|---|---|
| 679,207 | France | Jan. 6, 1930 |

OTHER REFERENCES

Vickers Magneclutch Bulletin No. 6000 (1950) of Vickers Electric Div. Copy available in Div. 12.